(12) United States Patent
Young

(10) Patent No.: US 7,115,813 B2
(45) Date of Patent: Oct. 3, 2006

(54) IN-WALL ELECTRICAL BOX

(75) Inventor: Joe A Young, Little Hocking, OH (US)

(73) Assignee: The Wiremold Company, West Hartford, CT (US)

( * ) Notice: Subject to any disclaimer, the term of this patent is extended or adjusted under 35 U.S.C. 154(b) by 220 days.

(21) Appl. No.: 11/095,375

(22) Filed: Mar. 30, 2005

(65) Prior Publication Data

US 2005/0217886 A1    Oct. 6, 2005

Related U.S. Application Data

(60) Provisional application No. 60/557,721, filed on Mar. 30, 2004.

(51) Int. Cl.
*H01H 9/02*    (2006.01)

(52) U.S. Cl. .............................. 174/53; 174/58; 174/57; 220/3.2; 220/3.3; 248/906

(58) Field of Classification Search .................. 174/50, 174/48, 49, 53, 57, 58; 220/3.2, 3.3, 3.4, 220/3.5, 3.6, 3.7, 3.8, 3.9, 4.02; 248/906; 439/535

See application file for complete search history.

(56) References Cited

U.S. PATENT DOCUMENTS

| | | | | | |
|---|---|---|---|---|---|
| 2,652,168 | A | * | 9/1953 | Nelson et al. | 220/3.4 |
| 4,247,738 | A | * | 1/1981 | Bonato | 174/53 |
| 4,674,646 | A | * | 6/1987 | Teron | 220/3.4 |
| 5,359,152 | A | * | 10/1994 | Hone-Lin | 174/53 |
| 5,679,924 | A | * | 10/1997 | Young et al. | 174/50 |
| 5,831,212 | A | * | 11/1998 | Whitehead et al. | 174/50 |
| 6,894,222 | B1 | * | 5/2005 | Lalancette et al. | 174/58 |
| 2004/0206536 | A1 | * | 10/2004 | Yip, Jr. | |
| 2005/0072589 | A1 | * | 4/2005 | Hull et al. | |

FOREIGN PATENT DOCUMENTS

JP    05003616 A  *  1/1993
JP    05276632 A  *  10/1993

* cited by examiner

*Primary Examiner*—Angel R. Estrada
(74) *Attorney, Agent, or Firm*—McAndrews, Held & Malloy

(57) ABSTRACT

An outlet box includes a main body having a top wall integrally formed with lateral walls, a bottom wall, and a back wall, wherein said top, lateral, bottom and back walls define an inner cavity therebetween, an electrical receptacle secured within the inner cavity, and at least one securing member adapted to secure the outlet box within a wall frame. The outlet box is secured to a feature within the wall frame by way of the at least one securing member prior to concrete being poured into the wall frame.

8 Claims, 2 Drawing Sheets

IN-WALL ELECTRICAL BOX

RELATED APPLICATIONS

This application relates to and claims priority benefits from U.S. Provisional Patent Application No. 60/557,721 entitled "In-Wall Electrical Box," filed Mar. 30, 2004, which is incorporated by reference herein in its entirety.

BACKGROUND OF THE INVENTION

Embodiments of the present invention generally relate to outlet boxes, and more particularly, to an outlet box that is positioned and secured within a concrete wall that allows access to the electrical outlets from outside the wall.

In order to provide electrical wiring at a position on a cast-in-place concrete wall, outlet boxes and conduits are typically mounted on the exterior of the finished wall. For example, after concrete has hardened and cured, thereby providing a solid concrete wall, an outlet box and corresponding conduit(s) are mounted on the hardened wall. However, outlet boxes and conduits that are positioned on the exterior of a wall are typically obtrusive. Further, the sight of an outlet box jutting out from the surface of a wall may be aesthetically unpleasant.

Thus, a need exists for a less-obtrusive outlet box that may be used with concrete a wall.

SUMMARY OF THE INVENTION

Embodiments of the present invention provide an outlet box configured to be positioned within a concrete wall. The outlet box includes a main body having a top wall integrally formed with lateral walls, a bottom wall, and a back wall, wherein the top, lateral, bottom and back walls define an inner cavity therebetween. An electrical receptacle is secured within the inner cavity. At least one securing member, such as a rebar clamp, is adapted to secure the outlet box within a wall frame. The outlet box is secured to a feature within the wall frame by way of the securing member prior to concrete being poured into the wall frame.

Embodiments of the present invention also provide a method of forming a concrete wall having an electrical receptacle substantially flush with an outer surface of the concrete wall. The method includes providing a structural frame for the wall, securing an outlet box, which includes top, lateral, bottom and back walls defining a receptacle cavity in which an electrical receptacle is secured, within the structural frame such that an outlet of the electrical receptacle is substantially flush with a plane that defines an outer surface of a finished wall, and pouring concrete into a cavity defined within the structural frame, wherein the concrete flows and hardens over the top, lateral and bottom walls, but not over the electrical receptacle, so that the outlet of the electrical receptacle is accessible from outside the wall.

Figure 1:
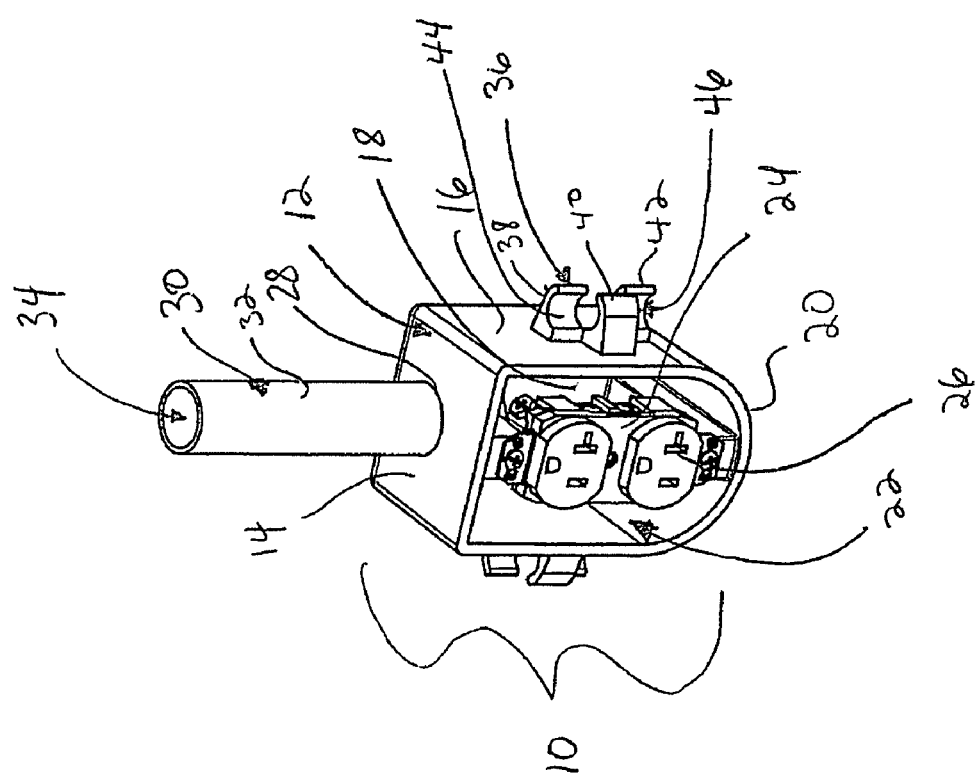
FIG. 1 illustrates an isometric view of an in-wall outlet box according to an embodiment of the present invention.

The foregoing summary, as well as the following detailed description of certain embodiments of the present invention, will be better understood when read in conjunction with the appended drawings. For the purpose of illustrating the invention, there is shown in the drawings, certain embodiments. It should be understood, however, that the present invention is not limited to the arrangements and instrumentalities shown in the attached drawings.

DETAILED DESCRIPTION OF THE INVENTION

FIG. 1 illustrates an isometric view of an in-wall outlet box 10 according to an embodiment of the present invention. The outlet box 10 may be a molded polyvinyl chloride box (PVC) configured to be used with a rigid PVC conduit. The outlet box 10 includes a main body 12 having a top wall 14 integrally formed with lateral walls 16, a back wall 18 and a curved lower wall 20. The top wall 14, lateral walls 16, back wall 18 and lower wall 20 define an inner cavity 22 therebetween. The inner cavity 22 is configured to receive and retain an electrical receptacle 24 having at least one outlet 26. The electrical receptacle 24 may be a power receptacle, communication receptacle, or various other types of receptacles.

The top wall 14 includes a passage 28 formed therethrough that is configured to receive and retain a conduit 30 and allow wiring or cable (not shown) to pass therethrough. The conduit 30 may be a PVC tube having a cylindrical outer wall 32 that defines an interior passage 34. The conduit 30 may be bonded to, or formed integrally with, the top wall 14. Optionally, the top wall 14 may include features, such as latches, threads, or the like that cooperate with reciprocal features formed on an end of the conduit 30 so that the conduit 30 may be latchably, threadably, snapably, or otherwise secured to the top wall 14.

Wiring or cables (not shown) may pass through the interior passage 34 and electrically engage contacts within the electrical receptacle 24. Thus, an electrical, communication, or like, path may be established from a source to the electrical receptacle 24 through the conduit 30.

The lateral walls 16 include rebar clamps 36. While a rebar clamp 36 is shown on each lateral wall 16, additional rebar clamps 36 may be positioned on the lateral walls 16. Further, a rebar clamp(s) may be positioned on only one of the lateral walls 16.

Each rebar clamp 36 includes three retaining prongs 38, 40, 42. The prong 38 is offset upwardly from the prong 40, which is in turn offset upwardly from the prong 42. Further, the prongs 38 and 42 are oriented in an opposing fashion to the prong 40. Each prong 38, 40 and 42 includes a curved rebar engaging surface 44. A rebar passage 46 is defined between the prongs 38, 40, and 42. The rebar clamps 36 are configured to snapably or securably engage a rebar wire (not shown) within rebar passage 46, thereby securely attaching the outlet box 10 to the rebar wire.

The outlet box 10 is secured within a wall mold, frame, or the like prior to concrete being poured therein. The outlet box 10 may be fastened to a portion of the mold, frame, or support therein, by way of screws, or other such fasteners. Further, the outlet box 10 may be secured to rebar wire positioned within a cavity defined by the mold or frame by one or more of the rebar clamps 36.

Once the outlet box 10 is secured within the mold, frame or the like, concrete is poured into the mold, frame or the like. As the concrete flows past the outlet box 10, the concrete flows around the curved (i.e., rounded) lower wall 20. Because the lower wall 20 is rounded, the concrete flows around the lower wall 20 such that there are no material voids below the lower wall 20. Before or after the concrete is poured (and/or hardened and cured), a cover (not shown)

may be positioned over the inner cavity 22. The cover includes passages that allow access to the outlets 26.

Figure 2:
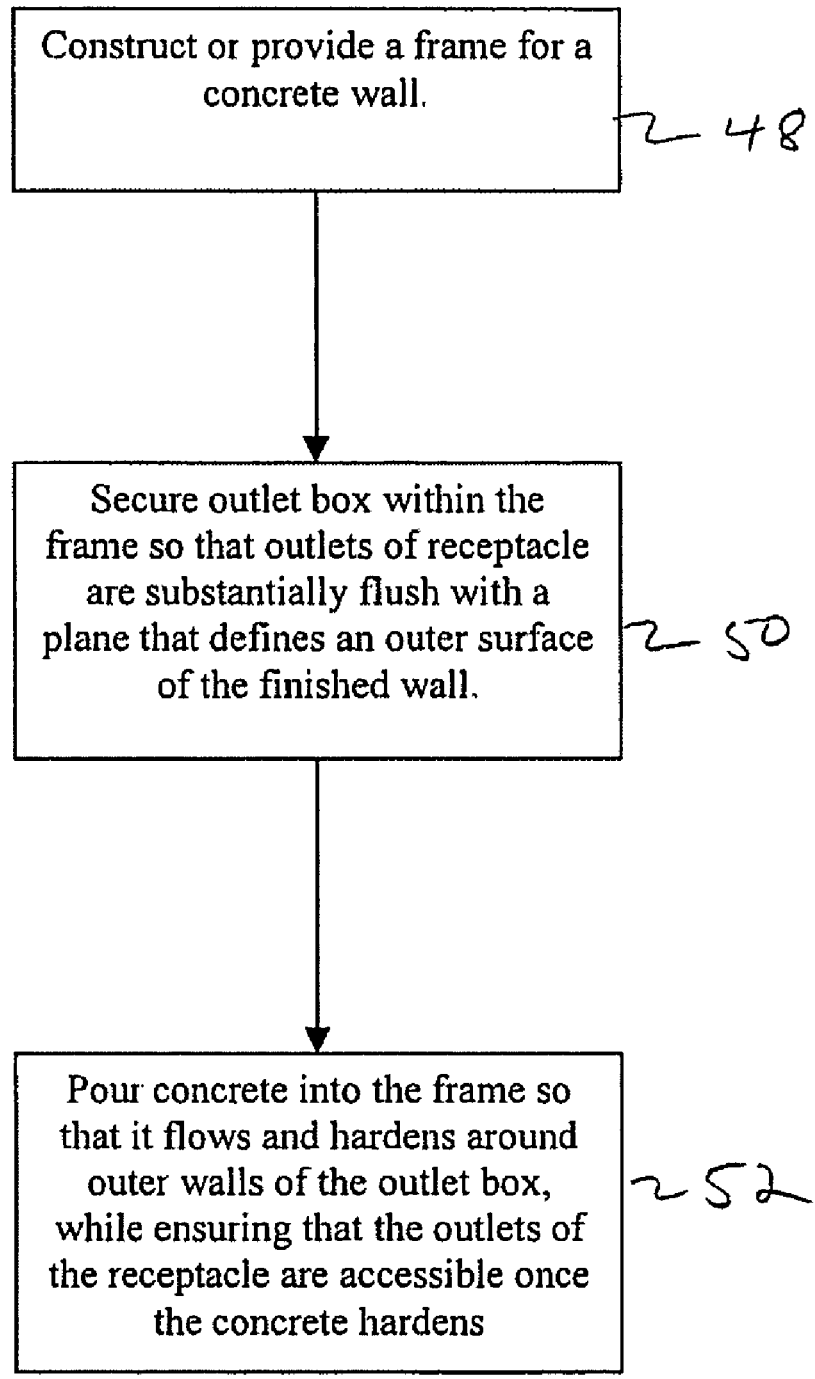
FIG. 2 is a flow chart of a method of forming a concrete wall according to an embodiment of the present invention.

FIG. 2 is a flow chart of a method of forming a concrete wall according to an embodiment of the present invention. At 48, a frame or mold for a concrete wall is constructed. Rebar may be positioned within the frame. At 50, an outlet box is secured within the frame (such as to a structural support of the frame or rebar wiring). The outlet box is secured so that outlets of the receptacle within the outlet box are substantially flush with a plane that defines an outer surface of a finished wall. At 52, concrete is poured into the frame so that it flows and hardens around outer walls of the outlet box. The concrete is poured so that the outlets of the receptacles are accessible from outside the wall once the concrete hardens.

Thus, embodiments of the present invention provide an outlet box that may be positioned within cast-in-place concrete walls. As such, the outlet box is substantially flush with an outer surface of the wall.

What is claimed is:

1. An outlet box configured to be positioned within a concrete wall, said outlet box integrally connected to an electrical conduit, said outlet box comprising:
   a main body having a top wall integrally formed with lateral walls, a bottom wall, and a back wall, wherein said top, lateral, bottom and back walls define an inner cavity therebetween;
   an electrical receptacle secured within said inner cavity; and
   at least one rebar clamp extending from at least one of said lateral walls adapted to secure said outlet box within a wall frame, wherein said outlet box is secured to a feature within the wall frame by way of said at least one rebar clamp prior to concrete being poured into the wall frame.

2. The outlet box of claim 1, wherein said bottom wall is rounded.

3. The outlet box of claim 1, wherein said outlet box is formed of PVC.

4. The outlet box of claim 1, wherein said at least one rebar clamp comprises a plurality of retaining prongs defining a rebar passage.

5. The outlet box of claim 4, wherein two of said plurality of retaining prongs are oriented in an opposing fashion to a third of said plurality of retaining prongs.

6. A method of forming a concrete wall having an electrical receptacle substantially flush with an outer surface of the concrete wall, said method comprising:
   providing a structural frame for the wall;
   securing an outlet box, which includes top, lateral, bottom and back walls defining a receptacle cavity in which an electrical receptacle is secured, within the structural frame through rebar clamps that extend from the lateral walls such that an outlet of the electrical receptacle is substantially flush with a plane that defines an outer surface of a finished wall; and
   pouring concrete into a cavity defined within the structural frame, wherein the concrete flows and hardens over the top, lateral and bottom walls, but not over the electrical receptacle, so that the outlet of the electrical receptacle is accessible from outside the wall.

7. An outlet box configured to be positioned within a concrete wall, said outlet box integrally connected to an electrical conduit, said outlet box comprising:
   a main body having a top wall integrally formed with lateral walls, a rounded bottom wall, and a back wall, wherein said top, lateral, bottom and back walls define an inner cavity therebetween; and
   an electrical receptacle secured within said inner cavity, said rounded bottom wall configured to allow concrete to flow around said bottom wall such that no material voids exist below said bottom wall when the concrete hardens.

8. The outlet box of claim 7, further comprising a plurality of rebar clamps having a plurality of retaining prongs defining a rebar passage.

* * * * *